US007791638B2

(12) United States Patent
McCutchen (10) Patent No.: US 7,791,638 B2
(45) Date of Patent: Sep. 7, 2010

(54) ROTATING SCAN CAMERA

(75) Inventor: David Johnstone McCutchen, Portland, OR (US)

(73) Assignee: Immersive Media Co., Portland, OR (US)

( * ) Notice: Subject to any disclaimer, the term of this patent is extended or adjusted under 35 U.S.C. 154(b) by 1628 days.

(21) Appl. No.: 10/954,585

(22) Filed: Sep. 29, 2004

(65) Prior Publication Data
US 2006/0072020 A1 Apr. 6, 2006

(51) Int. Cl.
*H04N 13/02* (2006.01)
(52) U.S. Cl. .............................. 348/46; 348/47; 348/48; 348/37; 348/42; 348/36; 348/806; 348/807
(58) Field of Classification Search ................. 348/46, 348/47, 48, 37, 42, 36, 806, 807
See application file for complete search history.

(56) References Cited

U.S. PATENT DOCUMENTS

| 3,591,269 | A |   | 7/1971  | Watson et al. |         |
|-----------|---|---|---------|---------------|---------|
| 4,235,515 | A |   | 11/1980 | Sheiman et al.|         |
| 4,241,985 | A |   | 12/1980 | Globus et al. |         |
| 4,532,544 | A |   | 7/1985  | Federau       |         |
| 4,602,857 | A |   | 7/1986  | Woltz et al.  |         |
| 4,754,334 | A |   | 6/1988  | Kriz et al.   |         |
| 4,977,323 | A |   | 12/1990 | Jehle         |         |
| 5,097,325 | A |   | 3/1992  | Dill          |         |
| 5,305,035 | A | * | 4/1994  | Schonherr et al. | 396/22 |
| 5,379,067 | A |   | 1/1995  | Miura         |         |
| 5,502,597 | A |   | 3/1996  | Estelle et al.|         |
| 5,659,804 | A |   | 8/1997  | Keller        |         |
| 5,721,585 | A | * | 2/1998  | Keast et al.  | 348/36  |
| 5,758,199 | A |   | 5/1998  | Keller        |         |
| 5,790,183 | A |   | 8/1998  | Kerbyson      |         |
| 5,903,782 | A |   | 5/1999  | Oxaal         |         |
| 6,031,541 | A |   | 2/2000  | Lipscomb et al.|        |
| 6,144,406 | A |   | 11/2000 | Girard et al. |         |

(Continued)

OTHER PUBLICATIONS

Wintriss Engineering Corporation, "OPSIS 5150 ALC Vision Processing Camera System", retrieved Feb. 18, 2000, pp. 1-2.

(Continued)

*Primary Examiner*—Shawn An
(74) *Attorney, Agent, or Firm*—Marger Johnson & McCollom PC (57) ABSTRACT

A scanning camera with a rotating drum has one or more sensors characterized by a non-radial optical axis. With two sensors on opposite sides of the drum and facing in substantially the same direction, stereoscopic recording of a panorama is accomplished as the drum rotates. The adjustment of convergence between stereoscopic viewpoints is described that improves the viewing and interpretation of stereoscopic images. Rapid rotation of the scanning camera produces panoramic motion picture recording, with the final frame speed dependent on the sensitivity and speed of the sensor, the resolution desired, and the capabilities of the recording device. The preferred embodiment employs rotating fisheye lenses for a substantially full-sphere field of view. Additional sensors in the same arrangement are used to increase resolution and light sensitivity through multiplexed or additive recording of the image data. Recording image information using film, either internal or external to the camera drum, is also described as a cost-effective alternative to digital media storage.

18 Claims, 9 Drawing Sheets

U.S. PATENT DOCUMENTS

| | | |
|---|---|---|
| 6,404,146 B1 | 6/2002 | Leske |
| 6,665,003 B1 | 12/2003 | Peleg et al. |
| 6,791,598 B1 | 9/2004 | Luken et al. |
| 6,922,211 B2 | 7/2005 | Sturiale |
| 7,129,971 B2 | 10/2006 | McCutchen |
| 7,525,567 B2 | 4/2009 | McCutchen |

OTHER PUBLICATIONS

"Introducing the CT-E4, DALSA's latest addition to its high sensitivity line scan family . . . ", retrieved Feb. 18, 2000, (one page).

Starks, M., "Stereoscopic Imaging Technology", 3DTV Corporation, 1996, pp. 1-19.

McMillan et al., "Plenoptic Modeling: An Image-Based Rendering System", ACM-089791-701-4/95/008, 1995, pp. 39-46.

Steadicam/PRO Manufactures, "Steadicam", Sep. 1999, pp. 1-4.

Better Light, Inc., "BetterLight Super8k . . . the Repro Perfectionist: The ideal solution for critical reprographic applications and large output", retrieved at http:///www.betterlight.com/Pages/all%20Pages%20-%20DATA/Super8K_Data.html, 1999 (two page).

Coastal Optical Systems, Inc., "Techical Specifications", retrieved Feb. 18, 2000 (one page).

Precision Camera & Video, "Widelux 35mm Panoramic Camera Summary" retrieved at www.precision-camera.com/rental/slr/3849.htm, 2000 (two pages).

LightPath, "What are GRADIUM Glasses?", retrieved at www.lightpath.com/Products/Glass/G101/whatis3.htm on Feb. 18, 2000 (two pages).

Pixelvision, "Products", retrieved at www.pv-inc.com/ on Feb. 18, 2000 (one page).

Scientific Imaging Technologies, Inc., "SITe Moving Sale", retrieved at www.site-inc.com/ on Feb. 18, 2000 (one page).

"Leading Edge: Motor cuts size by two-thirds", retrieved at www.ednmag.com, Jan. 6, 2000 (one page).

Litton-Poly-Scientific, "EC3848 High Speed Slip Ring Capsule", 2000 (one page).

Popular Mechanics, "Get your $10 Radar", http://popularmechanics.com/popmech/sci/tech/9411TUEEGM.html, Nov. 1994 (one page).

Wong, "Latest version of Ethernet to push network speed limit", http://news.cnet.com/category/0-1004-200-1544493.html, Feb. 8, 2000 (one page).

Mitsubishi Electric Corporation of America, "AJ-DH2700 D-5 VCR", retrieved at www.panasonic.com/PBDS/catalog/prod/aj-hd2700.html, 2000 (one page).

Koninklijke Philips Electronics N.V., "Flat TV", retrieved at http://www-us.sv.philips.com/newtech/ftt.html, 1999 (one page).

Management Graphics, Inc. "Solitaire Cine V Specifications: Professional Film Recorders for Motion Pictures", retrieved at http://www.mgi.com/products/cineV.fhtml?normal, Apr. 12, 1999 (two pages).

"Hulcherama Panoramic 120 S 3560 Panoramic camera", retrieved on Feb. 18, 2000 (one page).

Profeel, "Panasonic PV-HD1000 D-VHS Digital VCR designed for HDTV", retrieved from http://www.profeel.copm/pvhd1000.html on Feb. 18, 2000, (two pages).

Brown, "All About Steadicam: The Brown Stabilizer", retrieved at http://www.steadicam.com/gen/gen_about.htm on Feb. 18, 2000 pp. 1-4.

"SITeCCD Imaging Products" retrieved at http://www.site-inc.com/products.htm on Feb. 18, 2000 (two pages).

"Products", retrieved at http://www.pv-inc.com/products.htm on Feb. 18, 2000 (one page).

Office Action dated Mar. 29, 2004, corresponding to U.S. Appl. No. 09/505,601.

Office Action dated Mar. 23, 2007, corresponding to U.S. Appl. No. 10/800,976.

Notice of Allowance dated Oct. 3, 2008, corresponding to U.S. Appl. No. 10/800,976.

Notice of Allowance dated Feb. 9, 2006, corresponding to U.S. Appl. No. 10/800,978.

Amendment dated Aug. 10, 2007, filed in U.S. Appl. No. 10/800,976.

Eastman Kodak Company, "KL1-2113", Mar. 18, 1999 (one page).

\* cited by examiner

ROTATING SCAN CAMERA

BACKGROUND

1. Field of the Invention

This invention generally relates to a panoramic image reproduction system, and in particular to the use of rotary scanning elements in a camera design, with multiple sensors being used to establish stereoscopic viewpoints, adjust their convergence, and to increase the density of information being scanned.

2. Description of the Prior Art

Cameras for capturing still or motion pictures of the external world have usually used an area array sensor, such as a 640×480 Charge-Coupled Device (CCD) for NTSC video images. These area sensors use a rectangular or square area of light-sensitive elements and expose them all at once. New forms of Complementary Metal Oxide Semiconductor (CMOS) sensors for cameras are also being made in a variety of resolutions.

Linear scan sensors, either CMOS or CCD, are also being used to increase resolution for specific applications. These sensors have a single row of sensors, designed for monochrome or color readout, and sensitive to either visible light or some other part of the spectrum such as infrared or ultraviolet. The image is made by successive readouts of the sensor as it moves across the image, building up the final resolution. This is also sometime referred to as a slit scan or line scan sensor. Digital scans of this type are already found in such devices as fax machines and flatbed scanners. Line scan cameras are often used in industrial processes to obtain clear pictures of objects in motion. Examples of these cameras are the Wintriss Engineering OPSIS 5150ALC for monochrome images, which uses a monochrome CCD linear sensor with 5150 pixels and onboard image processing, and the DALSA CT-E4-2048W, which uses a color CCD linear sensor with 2048 pixels. Typically these cameras are fixed in place, and look at objects moving past them. Unlike area-scan sensors, the resulting images do not suffer from motion blur.

Scan-back digital cameras, such as the Better Light Model 8000 camera back are also doing high-quality digital still photography. The use of a slow scan from a linear sensor allows for maximum resolution to be built up when photographing artwork, documents or other subjects.

Scanning sensors are also used in so-called "push-broom" satellite surveillance applications, where as the satellite sweeps across the surface, a succession of readouts of the scanner creates a very large and detailed overall image. Existing panoramic slit scan cameras have also been made that use a moving slit to expose a strip of film, such as the Widelux™ camera for stills.

Various patents describe scanning cameras. All typically feature a rotation of the scanner to create the image according to an optical axis radial to the axis of rotation. Keller's "Panoramic Camera" (U.S. Pat. No. 5,659,804), for example, describes rotation of a scanner where the nodal point of the optics for the scanner is located radially according to the axis of rotation. Oxaal's "Method and Apparatus for Producing a 360° Spherical Visual Data Set" (U.S. Pat. No. 5,903,782) also involves a radial optical axis, this time for a "fisheye" lens. This is the approach used in the high-resolution digital PanoScan™ still camera. Jehle's "360 degree IR Surveillance with Panoramic Display" (U.S. Pat. No. 4,977,323) uses an infrared scanner also aligned radially to the axis of rotation. Federau's "Line-Scan Panoramic Camera" (U.S. Pat. No. 4,532,544) also describes a radial axis for a television camera. And Globus et al's "Panoramic Camera" (U.S. Pat. No. 4,241,985), marketed as the Globuscope™, employs a slit and a radial optical axis to expose a film strip.

Schonherr (U.S. Pat. No. 5,305,035) describes a design for slots that are intended to "seal off" the edges of a light-sensitive cylindrical recording surface when used with a rotating objective drum, thus preventing extraneous light at the edges of the recording, or "light safety". The drum of Schoenherr et al has a lens in its center which focuses light from a wide input image window on one side onto a narrow image output window on the other side, so that as the drum rotates, the light passes through this second window in a scanning fashion onto the fixed cylindrical recording surface outside of the drum. Because the recording surface is separate and outside of the drum, this device has a horizontal field of view that is inherently less than 180 degrees. Other film strip-based scanning cameras have also been made, going back to the cumbersome Cirkut camera of the nineteenth century. Contemporary examples include the Widelux, which exposes a film strip in 120-degree increments of rotation, and the Hulcherama camera which exposes a continuous strip of film in any amount of rotation, using gear motors to advance the film in time with the sweep of the lens. Woltz's "Panoramic Motion Picture Camera and Method" (U.S. Pat. No. 4,602,857) describes a rotating motion picture film camera. All of these cameras share the same orientation of the optical axis as being radial to the axis of rotation.

Keast, et al (U.S. Pat. No. 5,721,585) discloses a rotating camera which in one embodiment has two cameras with axes not radial to the axis of rotation. However, Keast depends upon the addition of counter-rotation relay optics between the lens and the sensor. This adds significant weight and complexity to the device, and also requires that a perfectly consistent geometrical relationship be consistently maintained between the input lens and the sensor along a long optical path, even while the whole apparatus is in rapid motion and presumably being carried in the field in the manner of a regular camera. The described counter-rotation optics are also inherently impractical, because as the overall apparatus rotates, at the point where the lens is opposite the sensor, the mirror surfaces and their optical supports need to completely disappear in order to avoid an interruption in the image.

What these solutions lack is an effective way to record not only the appearance of the real world in motion through the slit, but also to use that information to create a stereoscopic image of the entire field of view. Without that stereoscopic information, the most realistic picture of a surrounding scene is not possible, as well as other applications such as rangefinding that depend on parallax offsets between different points of view. The reason for this is that existing rotary solutions assume an optical axis for the light path that is radial to the axis of the rotating array. This restriction precludes the use of other axes in a rotating array for stereoscopic effects or increased resolution. If one attempted to create a stereoscopic view with two panoramic scans taken with such cameras, by taking them from two laterally offset points in space, the stereo illusion would be strong only for the area directly orthogonal to the axis connecting the two points, but would fall off to zero as you approached that axis in the course of looking around. This is described in McMillan & Bishop's "Plenoptic Modelling: An image-Based Rendering System" in SIGGRAPH 95 Conference Proceedings pp. 39-46. An overview of stereoscopic imaging systems, including relevant US and foreign patents, can be found in Michael Starks' summary article "Stereoscopic Imaging Technology" from 3DTV Corporation (http://www.3dmagic.com).

In a pair of stereoscopic panoramas, the lateral offsets between the objects in them represent their distances from the camera. However, these offsets can be dynamically removed by digital or other means, on a localized basis, to produce a more continuous image, with the amounts of correction also reflecting a depth map of the scene. This dynamic correction is in contrast with the static approaches of the prior art. Sheiman et al (U.S. Pat. No. 4,235,515), for example, discloses a fixed, physical viewing method using prisms in sheets to establish apparent dual images for stereo viewing, and is directed at creating a fixed setting that removes the overall lateral distortion between the images.

The use of multiple cameras can not only establish two stereoscopic viewpoints, but also be used to increase resolution and light sensitivity in the recording process. Keast et al describes the use of two cameras, purely for establishing stereo viewpoints, and the counter-rotation relay optics described preclude more than two cameras from being used. In addition, the described method suggests that there would be significant light interference between the light from the two cameras.

The present invention will address all of these shortcomings in the prior art. The present application is based in part on the disclosure document no. 466771 "Rotating Scan Camera with Oblique Axis" filed Dec. 22, 1999, and is a continuation-in-part of application Ser. No. 09/505,601 "Rotating Scan Camera" filed Feb. 17, 2000.

OBJECTS AND ADVANTAGES OF THE INVENTION

A. It is an object of the present invention to provide a method, and an apparatus for applying that method, for stereoscopic imaging of a surrounding scene by means of separated views having equal parallax separation throughout the scene.

B. It is also an object of the present invention to provide a method, and an apparatus for applying that method, for increasing the resolution of the recorded image by the use of multiple line scan sensors. Unlike the prior art, which is directed toward one to two sensors and optical paths, this use of multiple sensors enables better resolution in the final image and the use of sensors that would otherwise be unable to give good results in a single scan.

C. It is also an object of the present invention to provide a method, and an apparatus for applying that method, for increasing the light sensitivity of the recording device by the storage and addition of redundant scans from line scan sensors, unlike the prior art, which is directed toward a single pass recording of a given subject.

D. It is also the object of the present invention to provide a method, and an apparatus for applying that method, for recording panoramic images in full motion, by means of a simplified recording mechanism. The prior art is largely directed toward the production of panoramic still photographs, and the art featuring film-based recording in particular is unsuitable for motion picture photography, because of the need to put a large and heavy film transport and storage mechanism into rapid motion.

E. It is also an object of the present invention to provide means for recording a fully spherical field of view in a seamless manner. The prior art for panoramic scanning is primarily directed toward a cylindrical panoramic format that omits a substantial portion of the surrounding scene, and spherical imaging to date has mainly involved multiple views that must be seamed together prior to viewing, or scanning approaches that produce interruptions in the field of view.

F. It is also an object of the invention to dynamically adjust the convergence of a panoramic stereoscopic view in order to focus viewing on objects at selected distances. No prior art addresses this problem.

G. It is also an object of the present invention to provide a convenient and cost-effective method and apparatus for recording high-quality scan image data on film.

DETAILED DESCRIPTION

A rotary scanning camera of a novel design offers improved performance in capturing a panoramic surrounding scene. One or more line-scan sensors are used in a sweeping recording of a surrounding scene. The scan can be of a partial rotation or of one or more full rotations. Unlike most of the prior art, these sensors each have an optical axis that does not intersect the axis of rotation.

In the preferred embodiment, a rotating drum holds two or more line-scan devices for scanning the appearance of a surrounding field of view from stereoscopically separated viewpoints, with each optical axis on approximately a tangent line to the cylinder. This creates a pair of offset sweeping scans that record objects in the surrounding view from one, then the other, point of view, thereby creating an effective parallax separation in the recorded images. This parallax separation is the same for every point in the rotation of the drum.

Figure 1:
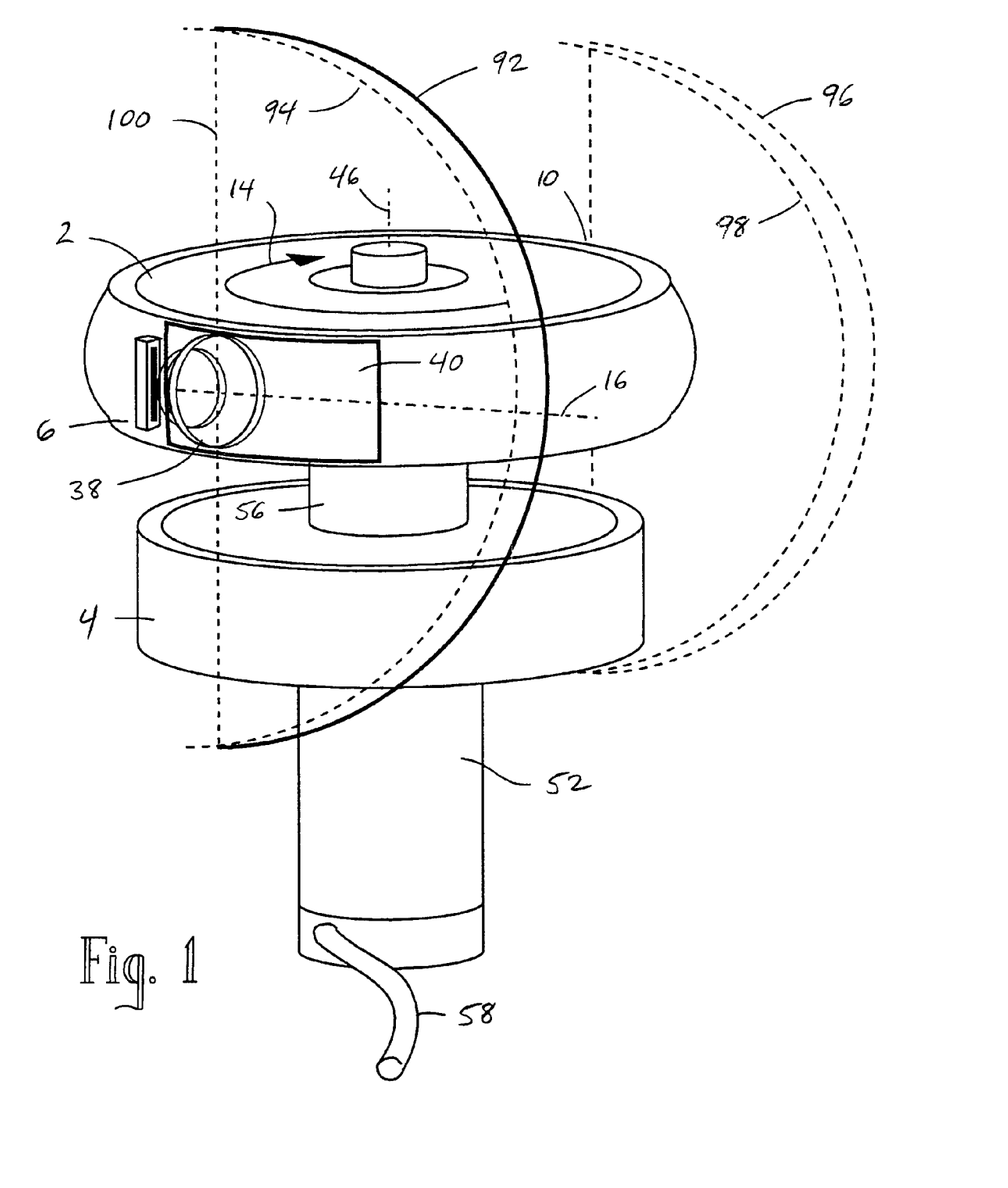
FIG. 1 shows an oblique view of the preferred embodiment of the rotating camera, with a hemispheric field of view for each of two sensors in a rotating camera drum with conventional fisheye lenses and streamlining elements.

FIG. 1 shows an oblique view of the preferred embodiment of the rotating camera, with a hemispheric field of view for each of two sensors 6 and 10 in a rotating camera drum 2 with streamlining elements such as at 40. A fisheye lens 38 with an optical axis 16 is shown for sensor 6, producing a scan 92 with a vertical field of view which extends 180 degrees. As the drum 2 rotates 14 around an axis of rotation 46, according to a motor 4, additional scans are produced, such as the second scan 94. The same is true for the scans 96 and 98 as recorded by the sensor 10. The vertical boundary of a scan's field of view is at 100. The signals from these scans, as well as any necessary input signals, pass through a slip ring connection 56 and through a connecting cable 58, shown here exiting at the base of a handle 52.

Figure 2:
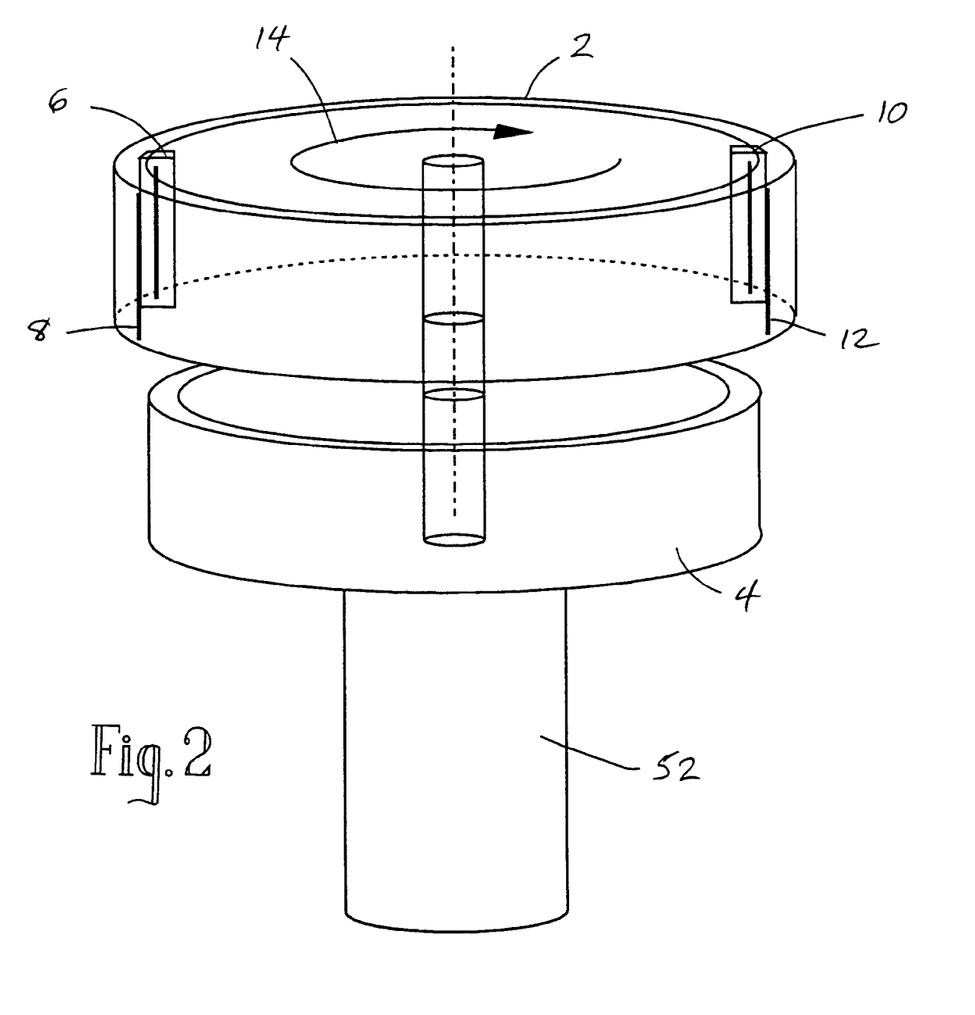
FIG. 2 shows a simplified oblique view of a basic embodiment featuring a rotating drum, the motor and carrying handle for it, and two sensors in offset positions, showing an aperture slit for each sensor.

FIG. 2 shows a simplified oblique view of a rotatable scan camera according to the present invention. The camera comprises a rotatable drum 2, actuated by a motor 4. This drum has a central axis of rotation 46 and a perimeter, which is the surface of the drum farthest from the axis of rotation. Two linear sensors, a Right-hand sensor 6 and a Left-hand sensor 10, are disposed at the circumference of the rotatable drum 2, each sensor having an aperture slit 8, 12. Each linear sensor has an associated lens through which light passes according to a central optical axis and forms a focused image on an image plane orthogonal to the optical axis. The linear sensor's active surface is located in this image plane. Each sensor also has associated electronics for the input and output of signals. The sensor, optics and electronics form a subcamera assembly within the rotatable drum, which rotates in a direction shown by the arrow, 14, preferably clockwise as seen from above.

For recording a surrounding scene in motion, this drum should be rotating very quickly, and the scans should be as rapid as possible. A preferred embodiment for recording motion would be a 5-inch diameter drum rotating at 3600 RPM, with two sensors, with a complete scanned image produced by each sensor every rotation, for an effective frame rate per sensor of 60 frames per second. The resolution of the image is constrained only by the sensitivity of the sensor and its readout rate, and the ability of the data recorder to keep up. To achieve a pleasing level of resolution when viewing a closeup of a part of the image, as will commonly be done, then the resolution of the overall image should be as large as possible. A preferred resolution for the scanned image frame produced by each sensor would be at least 2,000 by 4,000 pixels, which represents the rotation of a 2,000-pixel sensor sampled 4,000 times during each rotation. If this 8 million-pixel image frame is produced 60 times per second, this means 480 million pixels produced per imager per second, times two channels, or close to a billion pixels per second. This level of resolution, together with the stereoscopic qualities of the image, represents an extremely high level of realism.

One disadvantage of the use of line scan sensors is their relative insensitivity to light. If one is used to scan a scene, the light recorded for any spot is only able to be recorded in the brief amount of time that the sensor sweeps past that spot. To help solve this problem, a storage buffer should be used to store and add together multiple redundant scans. For example, an optimal equirectangular format might be 6000×3000 pixels. This can be reproduced, for example, by six cameras, each with a line scan sensor of 3000 pixels, that each sweep one-sixth of a sphere for each exposure period, after performing 1000 scans of 3000 pixels each. This represents a total pixel rate of 18 Mpixels/sec or 18 MHz, and means that the rotation needed to capture a circular or spherical frame would be six times slower than a single camera would require. With faster pixel readout rates there can be more scans performed, and if they are timed to coincide with the position of earlier scans, then the results can be stored and added together to build up a better reading of the available light. For example, an operating rate of 30 MHz for each camera would enable ten scans to be added together during the progress of an exposure period, representing a ten times improvement in exposure over a single pass. Due to the nature of the trailing of scans at the beginning and end of an exposure period, scans from adjacent cameras should be added together at these points to make a smooth transition. The scan depth increase can be used both to build up light sensitivity and to improve the dynamic range of the image, because of the larger number of samplings being applied to each pixel.

For motion to be recorded in this manner, even more scans would be needed. At 30 frames per second the above camera would have to perform 30,000 scans per second, and the overall pixel readout rate of the final image would be 540 Mhz (540 Mpixels/sec).

Another example also shows how multiple scans from a sensor can be added together for greater light sensitivity.

Figure 3:
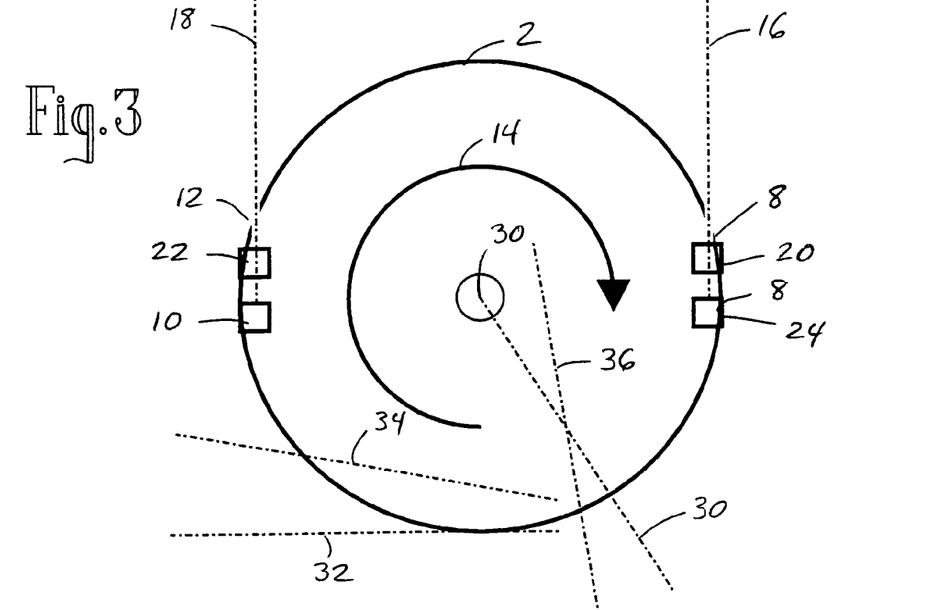
FIG. 3 shows a top view of the rotating drum of a basic embodiment, showing the sensor and lens components of the subcamera assemblies, along with the optical axis arrangements characteristic of the system.

FIG. 3 shows a top view of the rotating drum 2, showing the preferred tangential optical axes 16 and 18 of the Right and Left sensors 6 and 10, and their associated lenses at 20 and 22, respectively. A sensor such as at 6 is usually wider than the aperture slit 8; this means that effectively, because of the space constraints of the interior of the drum, an optical axis 16 cannot be actually on the tangent of the drum, but must be located a short distance away. What is shown here is an optimal arrangement, with two roughly parallel axes 16, 18 with apertures located slightly forward of the tangent point 24. Other axis arrangements can be used, except for a radial axis 30 intersecting the center point 26. Examples are a convergent axis such as is shown at 34, or a divergent axis such as at 70. A true tangent axis is shown at 32.

Figure 4:
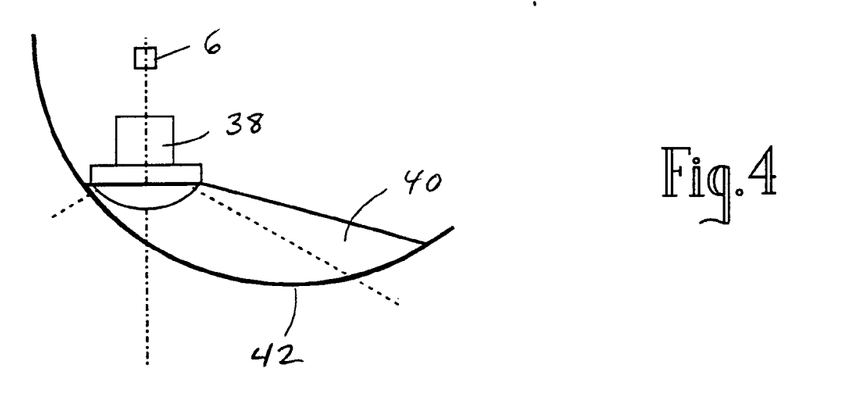
FIG. 4 shows a closeup schematic top view of the preferred embodiment using a fisheye lens with a streamlining covering for the drum surface.

FIG. 4 shows the preferred embodiment of a conventional fisheye lens 38 for a sensor 6, and an especially wide streamlining front element 40 conforming to the drum surface 42 that takes into account the wide horizontal field of view characteristic of this type of lens. For a specialized line-scan lens, the lens is very narrow and flat, with an arrangement of elements like a slice taken through the middle of a conventional lens. This flat lens has the advantage of the least surface interruption, but lacks the light-gathering abilities of a more conventional round lens, which is the preferred embodiment. While a flat fisheye line-scan lens for a slit aperture, such as those produced by Coastal Optical, may have an f-number of f8, a conventional round fisheye lens could have an f-number of f2.8, for nearly eight times more light delivered to the sensor.

Figure 5:
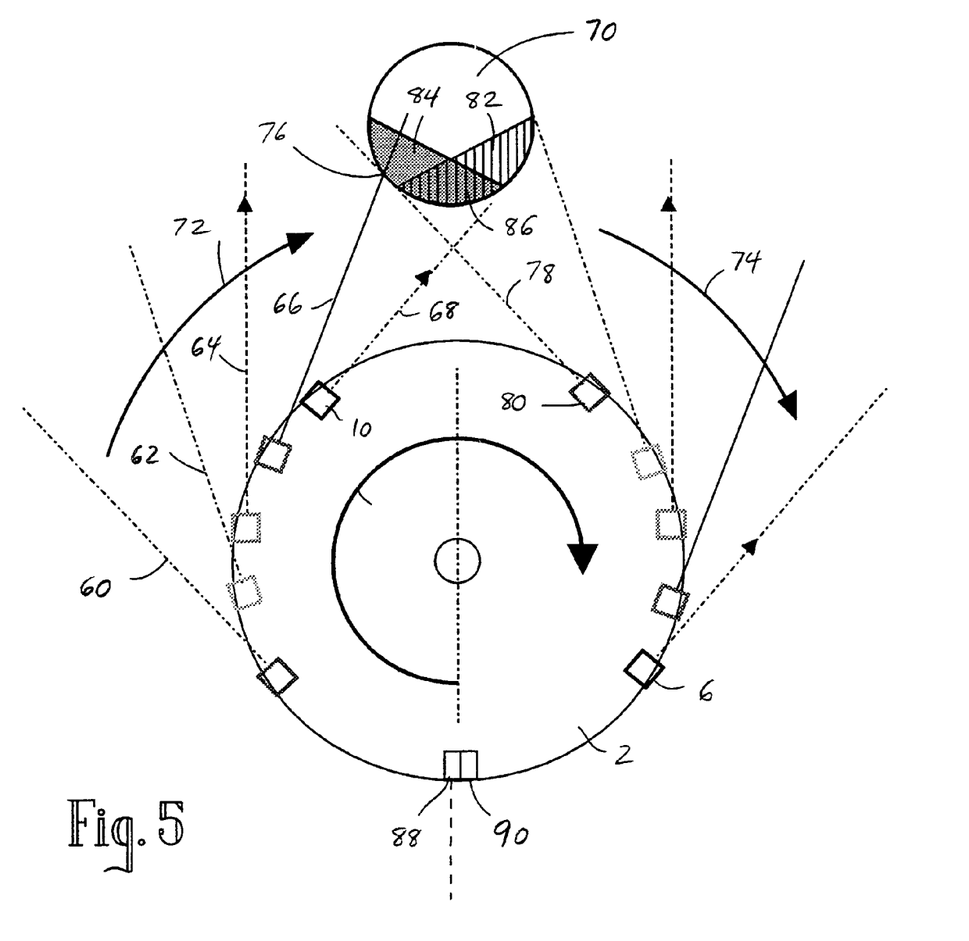
FIG. 5 is a top view of the camera drum in the preferred embodiment, showing the action of the spinning drum's sensors where an object in the field of view is scanned from different points of view, allowing for stereoscopic effects, with the addition of a rangefinding device as part of the scanning drum.

FIG. 5 shows the action of the spinning drum's sensors in the preferred embodiment where an object in the field of view is scanned from, one, then another, point of view. Five optical axes for the spinning sensor 10 on the drum 2 are shown at 60, 62, 64, 66, and 68, and how the scans of the sensors, especially for very near objects 70, simultaneously sweep different areas 72 and 74. Thus objects are scanned at different times, from different directions. For instance, a comparable area 76 of the near object 70 is shown as being scanned by sensor 6 according to the optical axis 78 at the first position 80, but the same target area is scanned at the fourth position 66 for the sensor 10. This scanning of objects from different points of view creates the parallax separations within the image that are the basis of any stereoscopic effect. The lateral location within the scanned image is a function of time, because it is the point in time at which the image appeared in the aperture. The scanned area on the object is shown for the Right 6 sensor at 82 and the Left 10 sensor at 84, as well of the area 86 of the object 70 where the images from the two sensors overlap.

The apparent stereoscopic separation produced by more than one point of view is called parallax, and the amount of parallax separation in the image from two fixed but separated sensors is determined by the distance between the camera and the object being viewed. Close objects, as seen against a distant background, will appear to be more laterally offset from each other than distant objects will. The distance to objects can be inferred if their images from both viewpoints are identified and measured, but this can be unreliable and calls for substantial processing power. A preferred way to determine this distance to a target object directly through the addition of a rangefinding element to the rotating camera drum. This rangefinder is shown as being made up of an emitter element 88 and a sensor element 90. This rangefinder, either a miniature radar, laser, or infrared-based unit, takes readings either continuously or at intervals, to determine a distance profile of the distances to the objects in the surrounding field of view during the course of a rotation. This distance profile is used to control an adjustment of parallax separation called convergence, in a convergence profile. The convergence profile can be used to minimize or exaggerate the effects of parallax. If minimized, then closer objects will appear more continuous, and the effect will be of less separation between the stereo viewpoints. If exaggerated, then objects in the distance will be easier to see in stereoscopic depth, as if the stereo viewpoints were widely separated in space.

The convergence profile continuously applies the distance readings from the rangefinder to dynamically shift the lateral placement of the vertical scan lines within the final image buffer used for readout. For example, again in FIG. 5, as sensors 6 and 10 rotate, a target on a nearby object 70 is seen according to two optical axes from the two sensors, first at 78 for sensor 6 and then at 66 for sensor 10. This makes 6 the leading sensor, producing the leading scan lines, and 10 the trailing sensor, producing the trailing scan lines. Therefore if the readings of a rangefinder 90 detects the close proximity of the object 70, then the application of delay to the recording of trailing scan line 66 will shift its apparent position closer toward the position of 64 or 62, simulating the appearance of target 76 as being at a much greater distance and having less parallax. Conversely, the application of delay in the recording of leading scan line 78 will make target 76 seem even closer. The record of these shifts in the course of an overall rotation of the camera is the convergence profile. Advances in the relative position of scan lines can also be done if they are stored in a buffer first, and then usually read after a delay, or in special cases even sooner.

Figure 6:
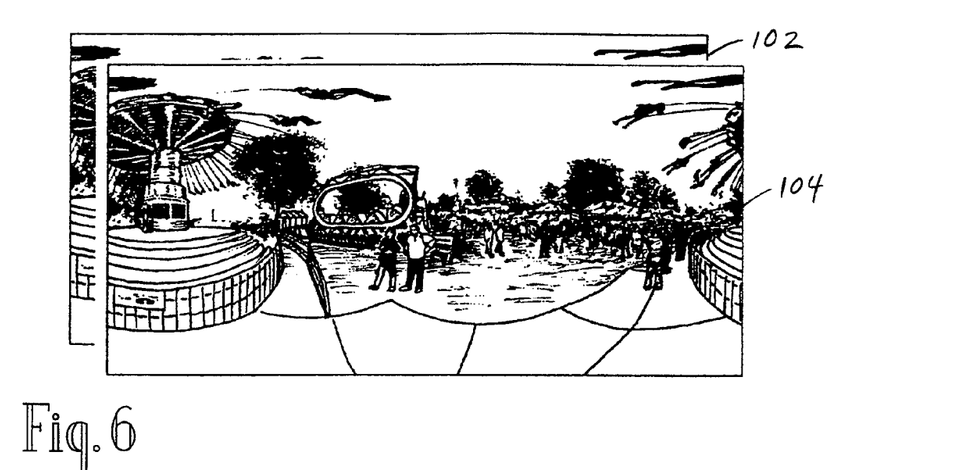
FIG. 6 shows two equirectangular stereoscopic views produced by scans of the preferred full spherical field of view according to the present invention.

FIG. 6 shows examples of two equirectangular stereoscopic views 102 and 104 produced by scans of a full spherical field of view from two sensors in the preferred embodiment. The scene here is of a carnival midway, with a swing ride sending riders overhead. This type of image is the result of a linear fisheye sensor with a hemispheric vertical field of view being rotated through a full 360-degree rotation. The two stereoscopic views can be considered as a "left-eye view" and a "right-eye view".

For simplicity, the optical axes of the multiple sensors in the camera should be in the same plane and essentially parallel, facing toward the same side of the drum, for the effect of convergence on objects at infinity. By the addition of delays or advances in one or both channels of the stereo image according to a convergence profile, the appearance of an object can be laterally shifted in the recording or playback in either direction according to the distance to the desired object, preferably as directly measured by a rangefinder.

Figure 7:
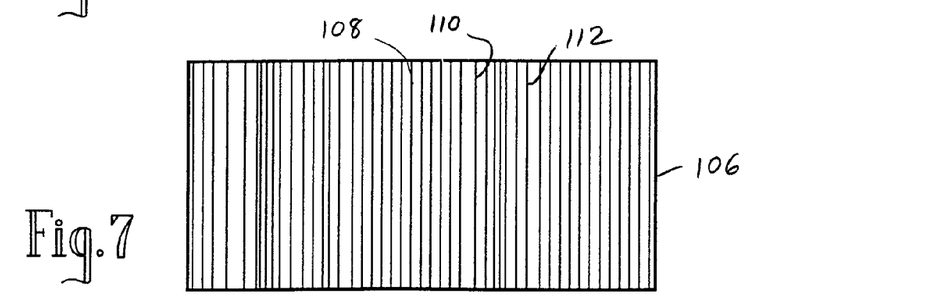
FIG. 7 is a schematic view showing the application of lateral distortion to portions of a recorded image to achieve stereoscopic convergence at a given distance, such as in would be produced by delays in the timing of the recording of scans.

FIG. 7 is a schematic view showing of the application of a convergence profile resulting in lateral shifting of portions of a recorded image to adjust stereoscopic convergence according to distance. This shifting is the result of adjustments in the timing of scans. What is shown here are the timings of the recordings of the scans, relative to an uncorrected timebase of recording which proceeds from left to right within the frame of information 106. All of the scan information proceeds through a FIFO delay buffer with a certain default delay. Adding to or subtracting from this default delay allows for shifts either forward or backward in time. An uncorrected region is shown at 108. A region where the scans are shifted to the right (forward in time) is at 110, and a region where they are shifted to the left (backward in time) is at 112. One view may be affected in this way, or both may be used for a greater range of corrections. As the position of the image information is shifted, the data from earlier or later scan lines usually needs to be taken into account and interpolated to produce the final image readout.

When the final image is viewed, either as a mono or stereo image, the preferred embodiment employs the extraction of a smaller movable window of interest as needed. This presents a more natural view of a portion of the overall scene, while allowing the freedom to look around in any direction. This extraction of a region of interest can be from either a live or prerecorded image stream.

Figure 8:
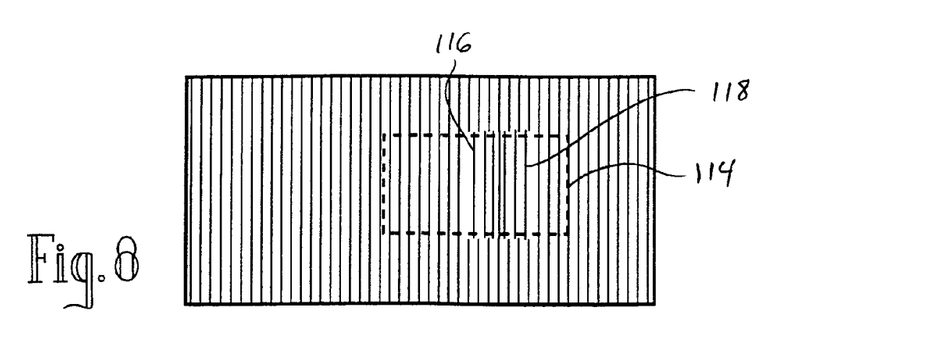
FIG. 8 is a schematic view showing a preferred embodiment wherein lateral distortion is applied to a region of interest within the overall image to achieve stereoscopic convergence

FIG. 8 is a schematic view showing of the preferred application of lateral shifting for convergence in a region of interest 114 within the overall image 106 in order to align objects atop one another. To conserve computational steps in this essentially digital process, this image transformation can be done only on the portion of the whole frame within or immediately adjacent to the region of interest 114. An example of a portion of the scans shifted forward in time is at 116, and scans shifted backward in time are at 118. An automatic convergence profile can be generated by the output of a rangefinder, but that profile can be modified to converge at different distances by manual control override as necessary to focus on specific objects.

The preferred recording device for picture information would be a digital recorder, such as a streaming tape or based digital recorder. Application of image compression to the picture information prior to use reduces the bandwidth necessary for any digital storage, transmission, or playback.

Figure 9:
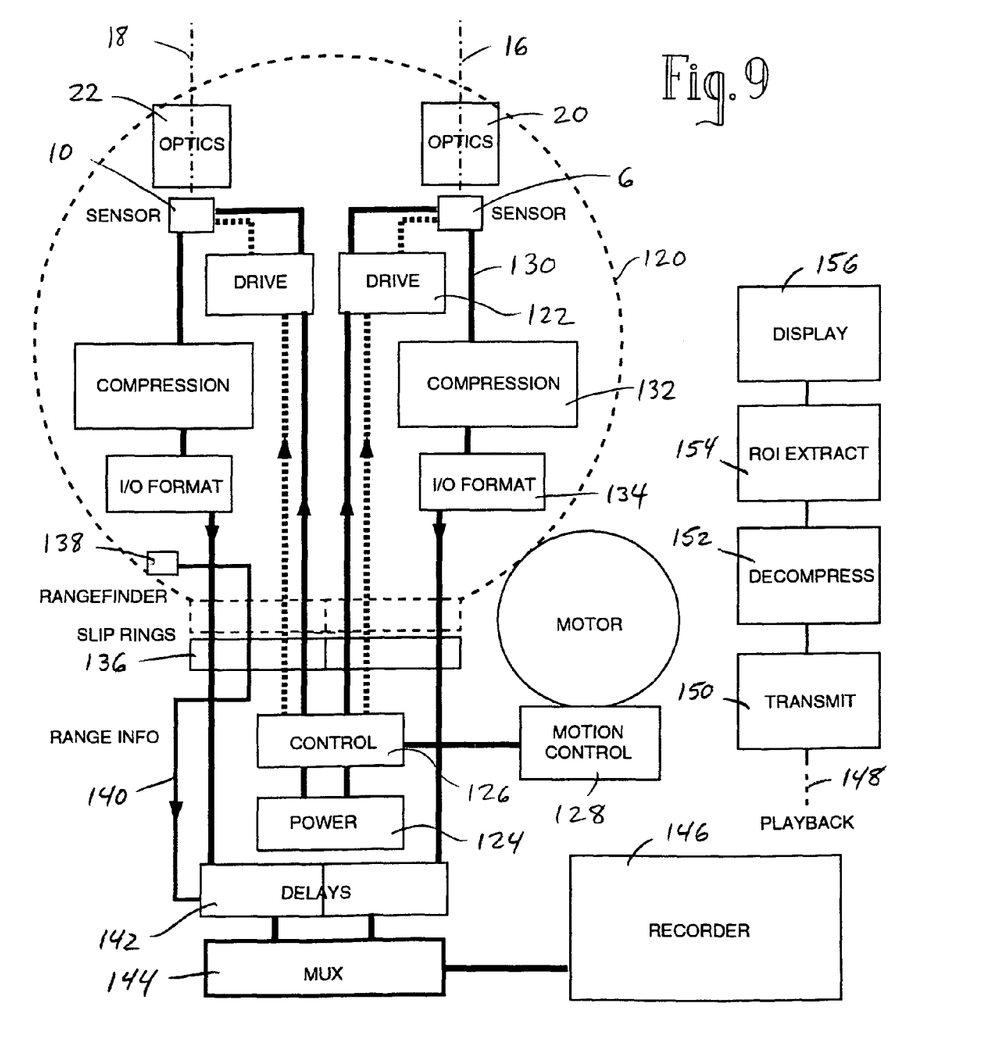
FIG. 9 shows a block diagram of the various components of the entire system in the preferred embodiment.

FIG. 9 shows a block diagram of the various components of the entire system in the preferred embodiment. The Right 6 and Left 10 Linear Sensors have equivalent associated components such as optics 20 and 22 and optical axes 16 and 18, respectively, forming two subcamera systems within the boundaries of the camera drum 120. Each sensor has its associated power and drive electronics 122 which are coupled to a central Power source 124 and Control electronics 126, which are related to the motion control regulation 128 for the motor 4. The sensor outputs an electronic signal representing raw digital image data 130. This data goes through image compression 132 and any necessary I/O formatting 134. Then the image signal exits the drum through rotary Slip Rings 136. A separate rangefinder 138 on the drum outputs distance data 140 for controlling stereoscopic convergence. The image data from the sensors then is processed with the appropriate delays 142 for alignment of their scans together in time, plus any convergence adjustments. To conserve the number of recorders needed, the data from both channels may be multiplexed together 144 prior to being sent to the recorder 146, which preferably should be digital.

During the Playback process 148, the image data can be transmitted 150 prior to decompression 152 as part of a display process featuring the extraction of a movable Region of Interest 154 which appears on a Display 156.

Alternate embodiments of the present invention are directed toward the solution of specific problems. For example, line-scan sensors at the present time do not have a fast enough readout rate to produce the above horizontal resolution if the drum spins around very rapidly. One solution to this would be to multiplex several sensors to fill in greater resolution.

Figure 10:
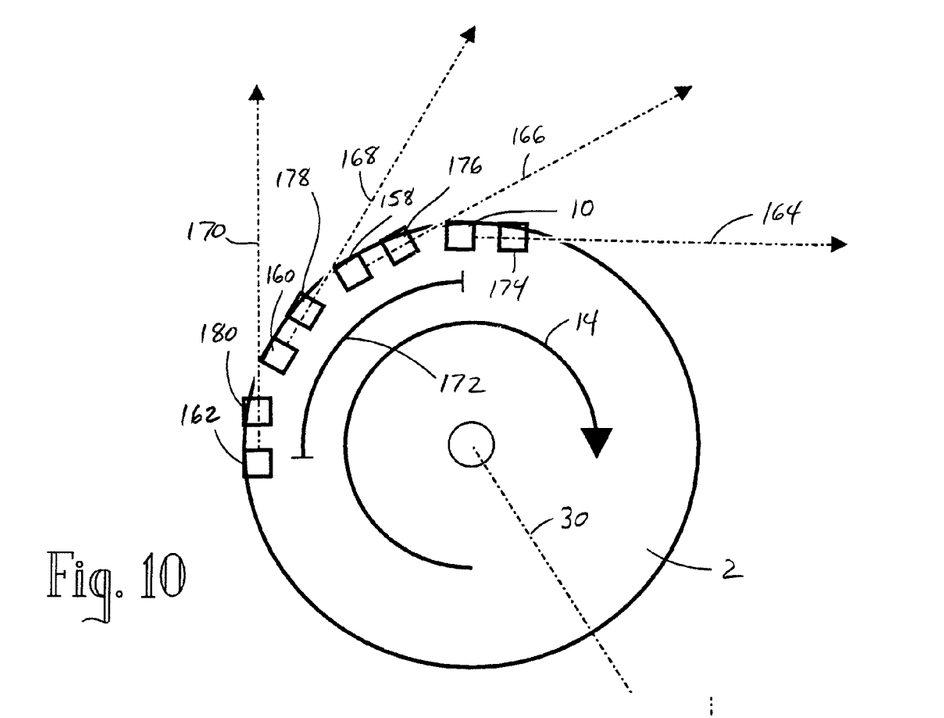
FIG. 10 shows a top view of an alternate arrangement for increasing the overall resolution, here with four sensors in place in a rotating drum, spaced around its circumference.

FIG. 10 shows an alternative embodiment of the present invention, comprising four sensors, 10, 158, 160 and 162, in place in a rotatable drum 2. If the requirement is for 4,000 scans during one revolution, which represents one frame, and the fastest that could be read from an individual sensor is 1,000 readings per frame, then these four sensors 10, 158, 160 and 162 could be used to build up the proper resolution. Each of the four sensors has the same angle of optical axis 164, 166, 168, and 170 relative to the drum 2, according to their associated lenses at 174, 176, 178, and 180, and the four sensors are equidistantly spaced around the circumference of the drum. In operation, with the drum rotating, each sensor would scan an object in the surrounding view at a slightly different time. By the addition of digital delays, these scans can be recorded adjacently, to produce an apparently continuous image.

Figure 11:
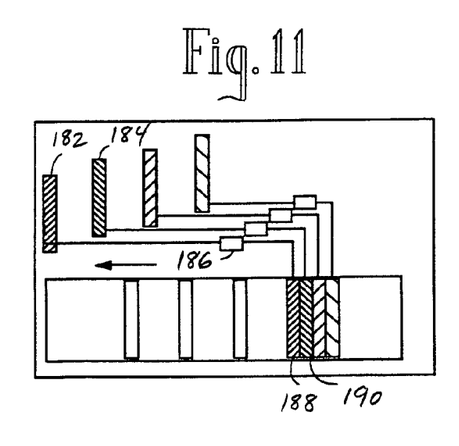
FIG. 11 shows a schematic diagram of the adjacent recording of the scans from different sensors, using various amounts of delay for the signal from each sensor.

FIG. 11 shows a schematic diagram of how a composite image is assembled from the data coming from the sensors, showing how sensor spacing about the circumference of the rotatable drum 2 is taken into account when recording signals from the sensors. At 182 is a scan signal from the first sensor 10, and at 184 is the signal from the second sensor 158, taken at the times when they are at roughly the same point on the rotating drum relative to the surrounding scene. By adding an appropriate amount of fixed delay 186, these scans of a given portion of the surrounding field of view are recorded adjacently at 188 and 190, respectively. Amounts of fixed delay for each sensor compensate for the time differences between when a scan took place and when it is recorded. It is preferable to have the sensor spacing be as close together as possible, to minimize any visible discontinuities due to these time differences between the adjacent scans as they are recorded in the final image.

Figure 12:
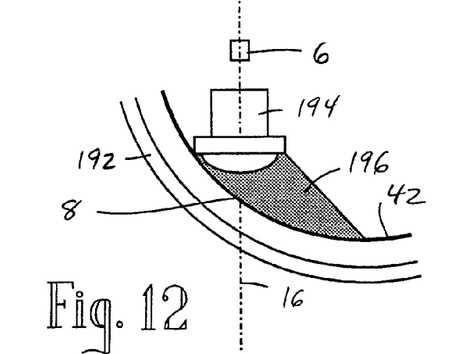
FIG. 12 shows a closeup schematic top view of a conventional lens for the sensor, and ways to streamline the rapidly rotating drum surface.

FIG. 12 shows an alternate embodiment for streamlining and soundproofing the camera. If a clear enclosure 192 is used to encase and soundproof the spinning drum 2, then the optical axis 16 of a sensor will exit the enclosure at a very oblique angle, producing distortion as it passes through the enclosure, and any seams in the clear enclosure will appear as interruptions in the overall recorded field of view. There is also the potential for problems from internal reflections from the enclosure surface into the lenses. Thus an enclosure is not the preferred solution to this problem.

The large front surface of a conventional lens 194 would oridinarily create an interruption on the drum surface 42 that would produce noise, but the front of the lens can be made to conform to the surface of the drum by a streamlining front element 196. An optimum design for a lens might be a hybrid, with a Gradium™ front element, where the differing refraction index characteristic of this type of glass runs laterally across the front of the lens, in a direction at a right angle to the line of the sensor. This produces a front element 196 that has the optical characteristics of a flat element, but which is thicker on one side than the other, to match the contour of the drum surface 42. The slant could be reversed for opposite sides of the drum, again to match the surface. An alternate covering would be more conventional glass for streamlining, but this has the risk of introducing optical distortion in some form.

For large amounts of image data, unusual recorders may be used. One applicable form of recorder is a film strip recorder. High-quality film has the advantage of offering higher density storage of image data, in an essentially analog form, at a lower cost than conventional digital streaming media, especially for large quantities of images.

Figure 13:
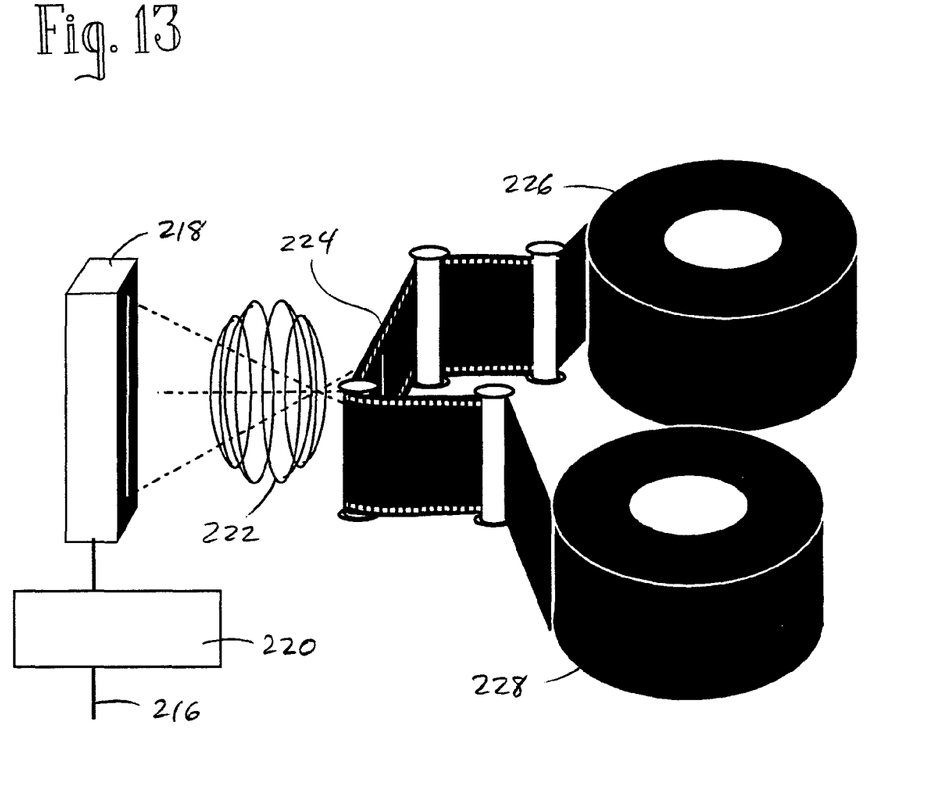
FIG. 13 shows an oblique schematic view of an alternate external film-based recorder for camera image information.

FIG. 13 shows an oblique schematic view of an alternative external film-based recorder for image information from the camera. Unlike conventional panoramic cameras, the film apparatus described here is located external to the camera drum itself. The dimensions of the film strip thus need have no physical relation to the primary drum apparatus. The only communication between the two is through electrical transmission of the signals from the sensors shown here coming in on a line 216. The image is formed for the film strip recorder by means that turn the electrical signals representing the scans back into light in a linear display 218. Amplification of the signals 220 can be applied if necessary to produce the proper image, which is focused and reduced through optics 222 before it is recorded onto the continuously moving film at an exposure point 224. The supply reel for the film is at 226, and the takeup reel is at 228. Because the film strip is in constant motion, a continuous image is built up through the recording process. Any divisions in this recorded image on film, such as frame divisions, should be based on the film sprocket holes outside the image, or other measurements of distance, and not be interruptions to the image. The image on the film can be digitized at another time if desired, such as for playback or transmission of the image.

Figure 14:
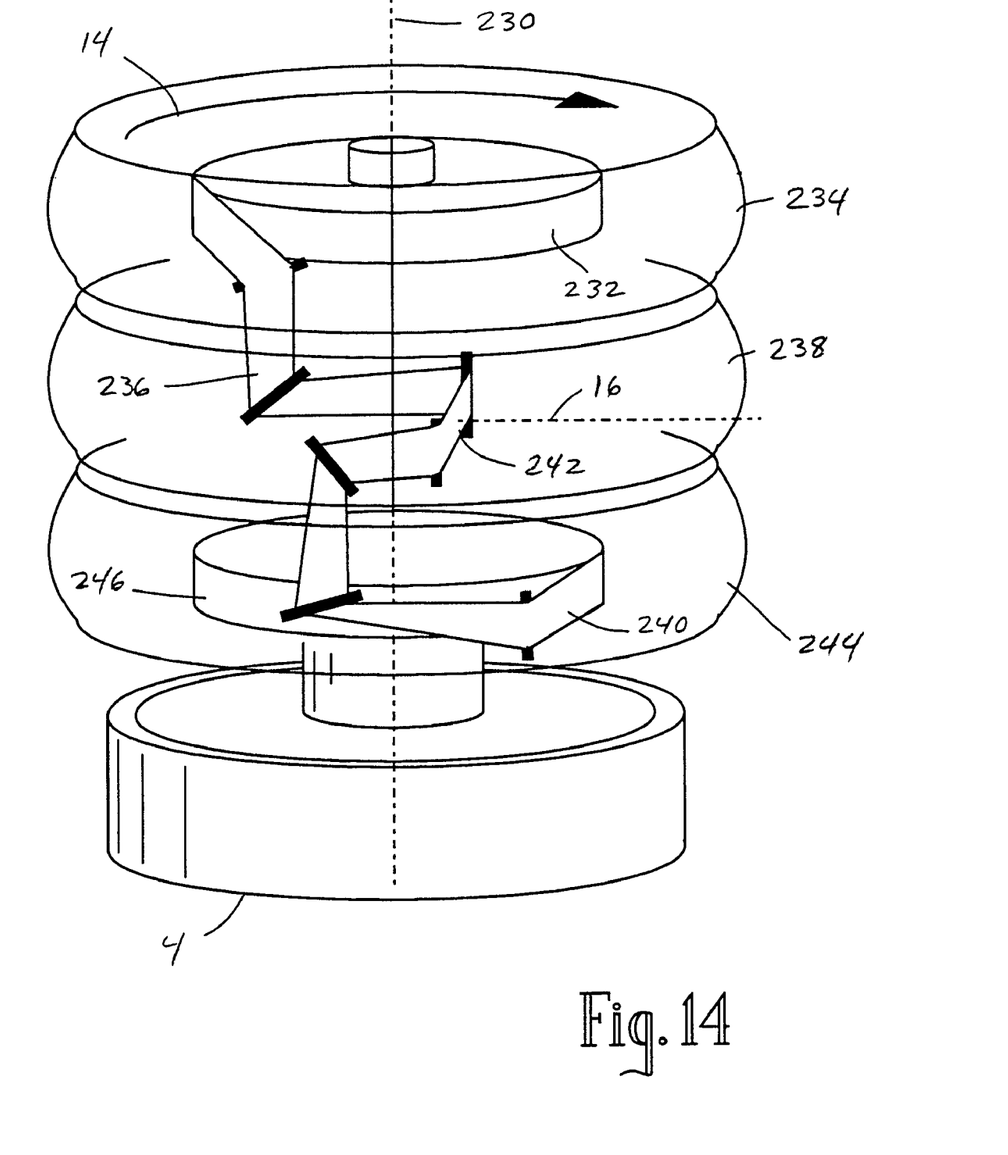
FIG. 14 shows an oblique view of an alternate embodiment of the camera drum using a film-based recording system.

FIG. 14 shows an oblique view of an alternate embodiment of the camera drum using a film-based recording system. The entire apparatus must rotate according to an axis of rotation 230. The supply reel 232 is in an upper portion of the drum 234, and the film 236 goes down into a middle portion 238 where it is exposed at 240 by a slit aperture according to the optical axis 16. The film proceeds down 242 to the lower portion 244 where it is wound onto the takeup reel 246. A similar arrangement of parts would have to be done for a second point of view such as for stereoscopic recording. This arrangement has the advantage of offering balance of the weight of the supply and takeup reels around a central axis of rotation 214. This allows rapid rotation without undue vibration and instability. Film as a recording medium may be chosen because certain films may be more sensitive than a digital sensor, and yield better images. However, this approach has several disadvantages. Foremost among them are the size and weight of the apparatus required, and the difficulty of putting it into rapid rotation for scanning.

OPERATION, RAMIFICATIONS AND SCOPE

Accordingly the reader will see that the rotating scan camera of this invention can be used to record a panoramic field of view with increased resolution and stereoscopic separation throughout the recorded image.

Although the description above contains many specificities, these should not be construed as limiting the scope of the invention but as merely providing illustrations of some of the presently preferred embodiments of this invention.

For example, a single oblique sensor will also produce a usable panoramic scanned image, although without the stereoscopic features of a dual scan. Lesser resolution sensors can be used for more inexpensive solutions or for situations where the bandwidth for recording or playback is limited.

The arrangement of optical axes shown here as tangential can also be created within a larger drum. In this case, the axes are still parallel and in the same plane, but the apertures are located farther forward from the tangent point. Oblique but not tangential axes can also be used, either convergent or divergent relative to the tangential axis. The optical axes in these cases still do not intersect at any point behind their lenses and within the drum, unlike the radial axis arrangement characteristic of the prior art.

The sensors can be in monochrome, color, or having another spectral sensitivity such as Ultraviolet or Infrared. An example of a color linear sensor is the Eastman Kodak KLI-2113, a trilinear RGB sensor with a 2098×3 resolution, an image area of 29.4×0.24 mm, a sensitivity of 14 bits, and a readout rate of 60 MHz. Other CCD and CMOS line scan sensors have other parameters. Generally speaking, at the present time, CCD sensors are more sensitive than CMOS sensors and allow for exposure of an entire vertical scan at once, but require more complex power sources. CMOS sensors, on the other hand, can incorporate many types of logic elements on the chips themselves. This enables on-chip functions such as digitizing, compression, enhancement, and pattern recognition.

Preferably the line scan sensor should be as sensitive to light as possible, as well as having a very fast readout rate. The fast readout rate enables many individual vertical scans to be read from the sensor while it is in motion, and the sensitivity of the sensor enables a usable image to be produced even during the extremely short exposure time represented by such rapid scans. PixelVision and Scientific Imaging Technologies of Beaverton, Oreg. have developed especially sensitive back-illuminated CCDs for astronomical use.

If multiple sensors must be used to build up the proper resolution, then they should be carefully spaced around the periphery of the drum while taking into account the desired resolution. For example, four sensors, each limited to a readout speed of only 1000 scans during the course of a revolution, are used to build up an overall resolution of 4000 scan tototal. If the four sensors are spaced within a span of 90 degrees on the drum and exactly 22.5 degrees apart, then every 62.5 scans (1000*(22.5/360), each sensor would reach the same position as the next one in line. The first sensor, in other words, would advance in the course of the revolution, and after 62.5 scans the next in line would reach the starting position of the first. What is needed, however, is not a mere duplication of the first reading, but another reading taken slightly ahead or behind this point, to help fill in the gaps represented by the readings of a single sensor. If the intention is to fill in the gap going backward, then the spacing between the sensors is increased by a slight amount representing one increment of the desired final scan resolution, in this case 4000 scans. For a 12.7 cm (5-inch) diameter drum, which is a preferred size to use because of the amount of parallax separation it produces, the circumference is 398.98 mm or almost exactly 10 scans/mm as the drum rotates. Thus the added increment of spacing for each would be approximately one-tenth of a millimeter.

Each sensor should have the same type of lens, to enable the matching of recorded images. Since the horizontal field of view of the line sensor is negligible, the important consideration for the lens is its vertical field of view. In the preferred embodiment, a fisheye lens, characterized by having a field of view of close to 180 degrees, is used to achieve an essentially spherical recording of the surrounding view as the drum rotates. The lens should be small, of high quality, and fast, which means that it transmits light efficiently. Good quality lenses of this type are being made by Coastal Optical. Estelle's "Wide-angle Photographic Lens System and Photographic Camera" (U.S. Pat. No. 5,502,597) describes an especially compact and efficient design for a wide-angle lens. In order to ensure recording of the area directly above the rotating camera, while creating a "blind spot" directly underneath it to hide a camera operator or mount, it may be preferable in practice to construct the subcamera assembly so as to raise the axis of the lens by up to 10 degrees from the horizontal plane of the drum.

As the vertical angle of view increases, an exposure difference becomes apparent in different segments of the line sensor. For a global scan of a spherical field of view, for instance, this exposure difference comes from the different rates of speed found in scanning around the poles versus scanning at the equator. Another way to illustrate this is to observe the difference in rotational speed of a point on a globe near the poles, as compared to a point on the equator. To adjust for this, a fixed signal compensation function can be applied to the signals from different sections of the linear sensor.

The motor assembly should be very smooth and quiet, and able to hold to a precise rotational speed. Various types of electronically controlled motors have been developed to meet these characteristics. A recent line of direct-drive brushless dc motors from Thomson Airpax Mechatronics Group are 66% smaller and 30% more efficient than other industry-standard motors. A smaller size for the motor would aid in the portability of the camera system by making it lighter in weight overall. Sinusoidal motion control is preferred for the smoothest possible regulation of speed. An 1800 RPM motor would produce an effective frame speed of 30 fps. This happens to be the type of motor used for the head drum in a VHS tape machine.

Rotary couplings such as slip rings are used to transfer electrical signals to and from the electronic elements in the rotating drum. Litton Poly-Scientific's EC3848, for example is a high speed slip ring assembly of up to 10 lines for rotational speeds up to 10,000 RPM. Examples of the type of signals that would go into the drum are power and timing signals for the sensors, while the readout from the sensors would come out along one or more lines as required. Some sensors have multi-tap readouts to increase effective resolution and data speed. The DALSA CT-E4-2048W, for example, uses the IT-PI-2048 sensor which has four simultaneous readout channels at speeds of 20 Mz to 25 Mz each, for an effective readout rate for the sensor of up to 100 MHz. The number of rings in the coupling depends on the number of electrical channels needed to maintain proper connections.

Rangefinding sensors come in a variety of configurations. The miniature radar-on-a-chip invented at Lawrence Livermore Laboratory in 1995 is one example of a low-cost sensor that could be used to obtain readings of the distance to various objects during the course of a scan. Active Infrared Autofocus devices such as found on still cameras could also be used, especially to give distance readings within a range of around 20 feet (6 m). LIDAR (Light Detection And Ranging) devices can also be used for scanning a surrounding scene, but the devices to date tend to have too slow a sampling rate to yield a detailed record of the depth of an overall scene.

For more convenient use of the image data from the sensors, compression should preferably be applied to the data prior to its transmission from the drum. Various methods for image compression are currently available, such as Discrete Cosine Transform (DCT) and the Motion Picture Experts Group (MPEG) family of motion picture compression. A preferred embodiment for compression in the present invention would be wavelet compression. The final data rate for the output would be determined by the desired level of quality in the image, as well as the optimum data rate of the recorder.

For digital readings from the sensors, a variety of data transfer protocols could be used for sending the data for external recording, transmission or processing. The transmission can be in the form of a wired or, preferably, a wireless connection. The preferred embodiment makes use of one of the new high-quality high-bandwidth standards. These include Fibre Channel (ANSI x3.230), which is made for fiber optics and has an effective speed limit of 400 mbps (million bits per second), the same speed as for the IEEE-1394 "Firewire" interface. Serial Digital Interface (SDI; a.k.a. SMPTE 292M) has a maximum speed of 1200 mbps, and Gigabit Ethernet, 1000 mbps. The Gigabit Internet standard (GVIF) has a maximum speed of 1776 mbps. An even faster data speed is represented by 10 Gbps Ethernet standard now being developed by the 10 Gigabit Ethernet Alliance, including such companies as Intel, Extreme Networks, Nortel, World Wide Packets, and other companies. This speed would handle the full-bandwidth data stream from the preferred resolution and frame speed described above as the preferred embodiment.

The image data coming from each sensor represents a vertical column. The columns are usually put together directly to make the final image in a digital buffer. However, if a video recorder is to be used for recording this type of image, then the recording method is modified, since video images are made up of rows, which are read out horizontally, rather than columns. In order to use this type of recorder, an image made up of columns is first stored in a buffer, then read out read out in rows, usually while a second buffer is being filled with the columns of a new frame. A readout of an HDTV video image of approximately 1920 by 1080 pixels (which can be identified as High-level, High-profile ADTV), is preferred, as a way of preserving maximum image quality within existing video standards. HDTV digital recorders such as the Panasonic AJ-HD2700 D-5 VCR (for a high-bandwidth SDI signal) or even the low-cost Panasonic PVHD 1000 D-VHS VCR (for a compressed signal) recorder are examples or recorders that could be used for this purpose. Present video standards in general, however, are not of high enough resolution for adequate recording of spherical scenes.

For a film strip recorder for the image information, the image can be formed for the film by a linear display. Many forms of displays and microdisplays may be suitable, depending on the brightness, size and image characteristics required. These displays include an LED or laser diode array, or a linear CRT, LCD, DLP (Digital Light Processing) or plasma display, with reduction and focusing optics as necessary to transfer the light onto the film. A linear color plasma display has the advantage of apparently continuous adjacent pixels. However, a plasma display such used in the Philips Flat TV, for example, has pixels measuring 1.08 mm square; therefore a 2098 pixel linear sensor requires an array 226.584 cm (89.2 inches) long, which requires substantial reduction optics. An alternate form of arrangement would be to split the display into a multiplicity of sections, which are combined to make a continuous recorded image. This can make use of any multi-tap readouts of the sensor, such as those featured in the DALSA camera mentioned above, where each of the four parallel channels coming from the sensor can be made to control its own display array. The Cine V Solitaire Image Recorder (U.S. Pat. No. 4,754,334) is an example of an advanced film recorder for digital data.

The extracted signals from the sensors can be sent to other locations for use via electronic transmission, for either a live or a prerecorded image. It is preferred that a movable region of interest be extracted from within the overall image, either live or prerecorded. If taken from the live image, then if desired, the rest of the image can be discarded. This has the advantage of reducing the overall requirements for transmission or processing.

Thus the scope of the invention should be determined by the appended claims and their legal equivalents, rather than by the examples given.

LISTED PARTS IN DRAWINGS

FIG. 6
2. Cylindrical drum
4. Motor for rotatable drum
8. Aperture for Right sensor
92. Hemispherical linear scan from right sensor
94. Second hemispherical scan from right sensor
96. Hemispherical linear scan from left sensor
98. Second hemispherical scan from left sensor
100. Vertical boundary of hemispherical FOV FIG. 2
6. Right-hand sensor
10. Left-hand sensor for stereoscopic scan
12. Aperture for Left sensor
14. Clockwise direction of rotation FIG. 3
16. Semi-tangent optical axis for Right sensor
18. Semi-tangent optical axis for Left sensor
20. Right lens
22. Left lens
24. Tangent point
26. Center of rotation
28. Drum surface
30. Radial axis
32. Tangential axis
34. Convergent axis
36. Divergent axis FIG. 4
38. Fisheye lens
　Wider front
42. Drum surface FIG. 5
60. First rotary position of Left sensor
62. Second rotary position
64. Third rotary position
66. Fourth rotary position
68. Fifth rotary position 70. Near object
72. Area of first sweeping scan
74. Area of second sweeping scan
76. Target area of near object
78. Axis for first position of Right sensor
80. First position of Right sensor
82. Scanned area on object from Right sensor
84. Scanned area on object from Left sensor
86. Area of overlapping scans
88. Rangefinder emitter
90. Rangefinder sensor FIG. 6
102. First equirectangular view
104. Second equirectangular view FIG. 7
106. Frame of information
108. Uncorrected scans
110. Scans shifted to right (delay forward in time)
112. Scans shifted to left (delay backward in time)

FIG. 8
114. Region of Interest
116. Selected scans shifted forward in time
118. Selected scans shifted backward in time FIG. 9
120. Boundary of Drum
122. Power and Drive for sensor
124. Central Power
126. Central Control
128. Motion Control
130. Raw digital image data
132. Image compression
134. I/O formatting
136. Slip rings
138. Rangefinder
140. Distance Data
142. Delays
144. Multiplexing
146. Recorder
148. Playback
150. Data Transmission
152. Decompression
154. Region of Interest Extraction
156. Display of ROI FIG. 10
158. Extra interpolated sensor #2
160. Extra interpolated sensor #3
162. Extra interpolated sensor #4
164. Basic optical axis for sensor #1 (Left)
166. Extra optical axis for #2
168. Extra optical axis for #3
170. Extra optical axis for #4
172. Rotational distance between sensors 1 and 4
174. Lens for sensor #1
176. Lens for sensor #2
178. Lens for sensor #3
180. Lens for sensor #4

FIG. 11
182. Scan from #1
184. Scan from #2
186. Delay for #1
188. Recorded position for scan #1
190. Recorded position for scan #2

FIG. 12
216. Transmission line for sensor information
218. Linear display
220. Amplification and processing of signal for display
222. Reduction optics
224. Film recording
226. Supply reel
228. Takeup reel FIG. 13
230. Axis of rotation
232. Supply reel for film camera drum
234. Upper portion of drum
236. Film in upper portion
238. Middle portion of film camera drum
240. Film in lower portion
242. Exposure point
244. Lower portion of film camera drum
246. Takeup reel for film camera drum

I claim:

1. A camera for recording a panoramic field of view in a scanning fashion, comprising:
   i. a rotatable drum having an axis of rotation and a perimeter;
   ii. an even number of subcameras disposed at the perimeter of the drum, each subcamera comprising:
      a lens having an optical axis substantially tangential to the perimeter of the drum and an image plane, said optical axis being not radial to said axis of rotation;
      a linear sensor having a sensor area which intersects said optical axis and which lies within the image plane; and
      transmission means for transferring digital information representing the scan line readings from the linear sensor;
   iii. storage means for storing the digital information representing the scan line readings from the linear sensors;
   iv. processing means for adjusting the positioning of the digital information representing the scan line readings in a final composite image; and
   v. recording means for recording the final composite image.

2. The camera of claim 1, wherein the subcameras are disposed substantially on opposite sides of said drum, and provide in the course of the regularly repeated rotation of the drum, a repeated viewing of objects in the surrounding environment from two points of view with parallax separation.

3. The camera of claim 1, wherein each lens has a vertical field of view of at least 160 degrees.

4. The camera of claim 1, wherein the rotation of the rotatable drum is 360 degrees, and repeated in regular periods.

5. The camera of claim 1, wherein the digital information representing the scan line readings of the linear sensor, representing pictorial information, are grouped to form images representing a portion of a rotation.

6. The camera of claim 1, wherein image compression is applied to the pictorial information.

7. The camera of claim 1, wherein processing means are used to extract a movable region of interest from the pictorial information.

8. The camera of claim 1, wherein the images represent images with stereoscopic separation.

9. The camera of claim 8, wherein both stereoscopic images are viewed together as a stereo pair.

10. The camera of claim 8, wherein the convergence of the stereoscopic images is controlled by lateral distortion of one of the images relative to the other.

11. The camera of claim 10, wherein a rangefinding sensor on the drum is used to determine the amount of lateral distortion applied.

12. The camera of claim 1, wherein said recording means include a film recorder, and said line scan readings are first converted into light before being recorded on a strip of photographic film.

13. A method for recording a panoramic field of view in a scanning fashion, comprising:

rotating about an axis of rotation plural subcameras that are positioned along a perimeter, each subcamera including a lens and a linear sensor, the lens having an optical axis that is substantially tangential to the perimeter and an image plane and is not radial to the axis of rotation, and the linear sensor having a sensor area that intersects the optical axis and lies within the image plane;

transferring digital information representing the scan line readings from the linear sensors and storing the digital information representing the scan line readings; and adjusting positions of the digital information representing the scan line readings in a final composite image and recording the final composite image.

14. The method of claim 13 in which the plural subcameras are an even number of subcameras.

15. The method of claim 14 in which adjusting positions of the digital information representing the scan line readings includes processing the scans so as to assemble the final composite image with stereoscopic separation throughout the image to form a stereoscopic image.

16. The method of claim 15 further including the step of applying digital delays to the digital information representing the scan line readings according to a convergence profile to adjust convergence of the stereoscopic image.

17. The method of claim 16 further including the step of determining the convergence profile by input of a rangefinding device that is rotated with the sensors.

18. The method of claim 13 in which the plural subcameras are plural pairs of subcameras, the method further comprising recording digital information representing the scan line readings with adjusted timing so that the digital information representing the scan line readings of different pairs of subcameras are interleaved with each other.

* * * * *